April 12, 1927.   1,624,849
C. W. STEELE ET AL
METHOD OF AND APPARATUS FOR MAKING HOLLOW ARTICLES
Filed June 19, 1922   5 Sheets-Sheet 2
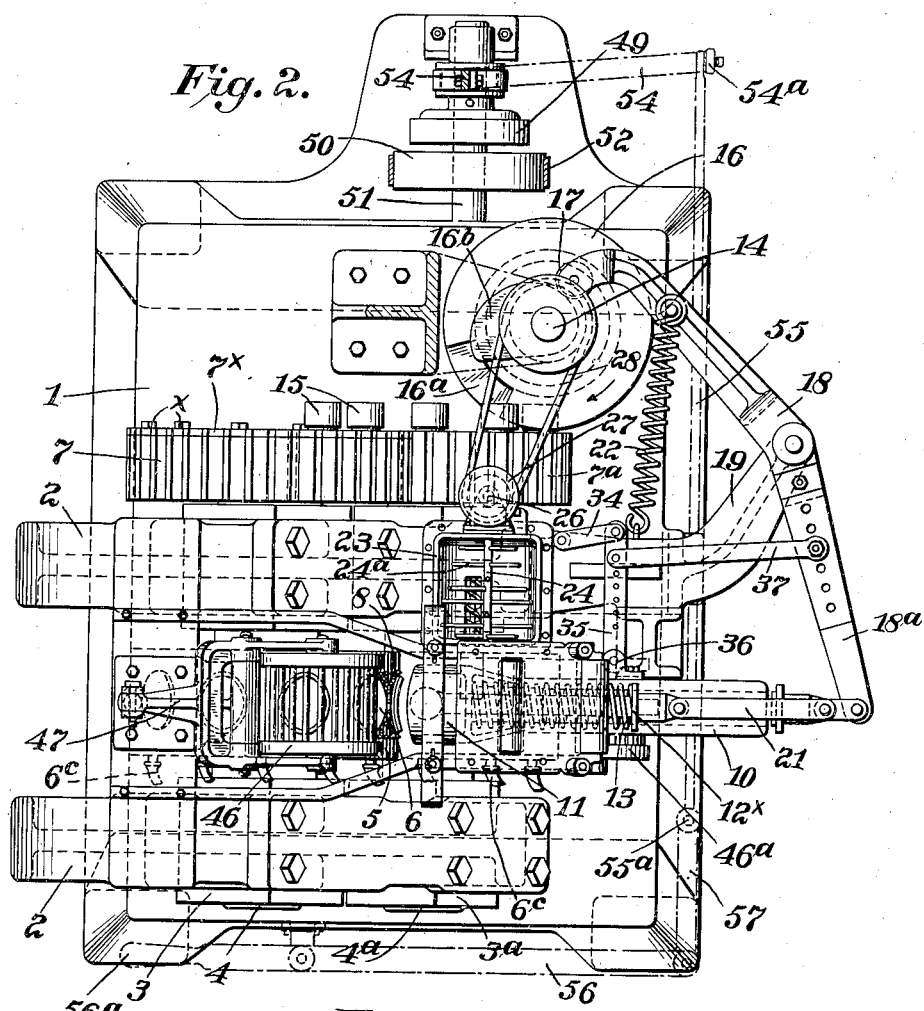
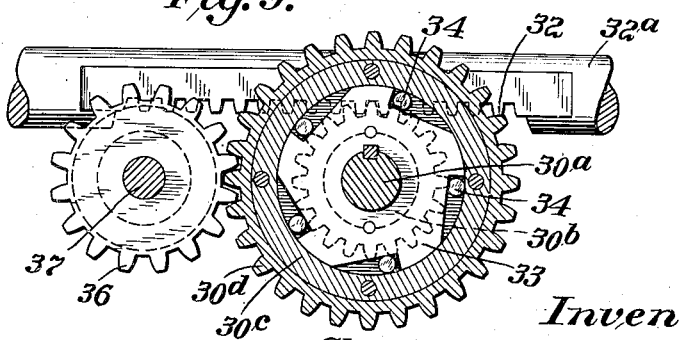
Inventors:
Charles W. Steele,
Richard T. Griffiths,
by their Attys.

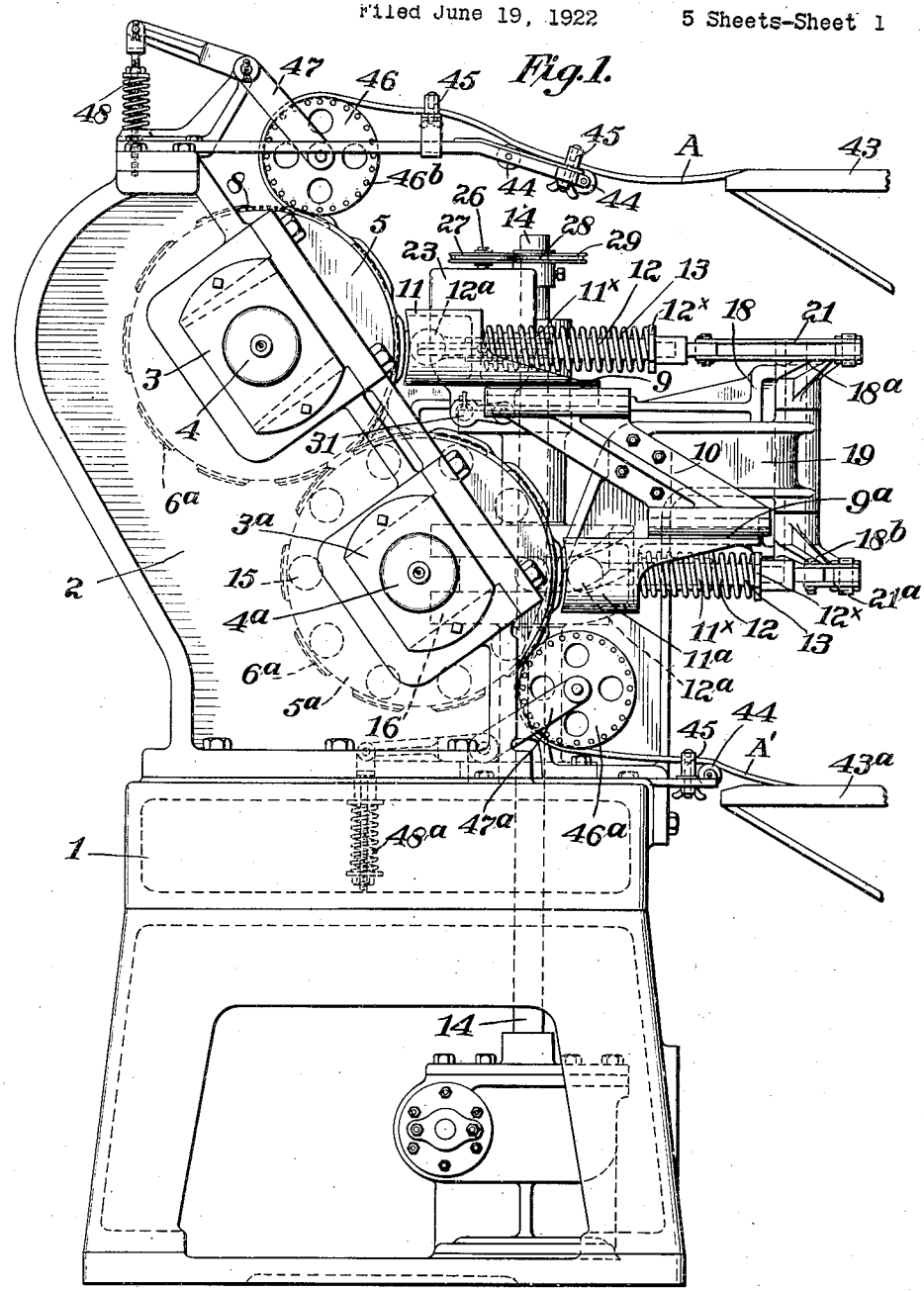

Inventors:
Charles W. Steele,
Richard T. Griffiths,

April 12, 1927.  
C. W. STEELE ET AL  
1,624,849  
METHOD OF AND APPARATUS FOR MAKING HOLLOW ARTICLES  
Filed June 19, 1922 5 Sheets-Sheet 5

Inventors:  
Charles W. Steele,  
Richard T. Griffiths,  
by Spear Middleton Donaldson & Hall  
Attys.

Patented Apr. 12, 1927.

1,624,849

UNITED STATES PATENT OFFICE.

CHARLES W. STEELE AND RICHARD T. GRIFFITHS, OF AKRON, OHIO, ASSIGNORS TO THE MILLER RUBBER COMPANY, OF AKRON, OHIO, A CORPORATION OF OHIO.

METHOD OF AND APPARATUS FOR MAKING HOLLOW ARTICLES.

Application filed June 19, 1922. Serial No. 569,494.

Our present invention relates to an improved method of and apparatus for making hollow articles from plastic sheets.

The invention aims to provide a novel method and apparatus by which balls of a uniform and high grade character may be rapidly and economically made from plastic material by the use of rotary dies affording an unbroken feed of the plastic sheets.

With these and other objects in view, which will appear from the following detailed description, the invention includes the novel method of procedure and apparatus for carrying out such method as hereinafter described, the nature and scope of our invention being defined by the claims appended hereto.

In order that the invention may be the more readily understood reference is made to the accompanying drawings in which—

Figure 1 is a side elevation of our improved machine or apparatus.

Figure 2 is a plan view with parts broken away.

According to our novel method the plastic stock in sheet form passes around rotatable molds or dies having mold cavities into which the stock is mechanically shaped or cupped (as distinguished from shaping by air pressure differential) and whereby the juxtaposed edges of the stock are joined and severed from the sheets, after which the uncured articles or biscuits are transferred to a vulcanizing mold or molds in which they are vulcanized.

The apparatus for carrying out such method comprises a bed plate, 1, on which are mounted two vertical frames 2 provided with suitable bearings 3 and $3^a$ for a pair of parallel horizontal shafts 4 and $4^a$.

Fast on these shafts between the frames are located the drums or cylindrical die or mold members 5 and $5^a$ which are so arranged and positioned as to have the juxtaposed portions of their peripheries spaced apart a distance corresponding substantially to the thickness of the two sheets from which the biscuits are formed.

Figure 3:
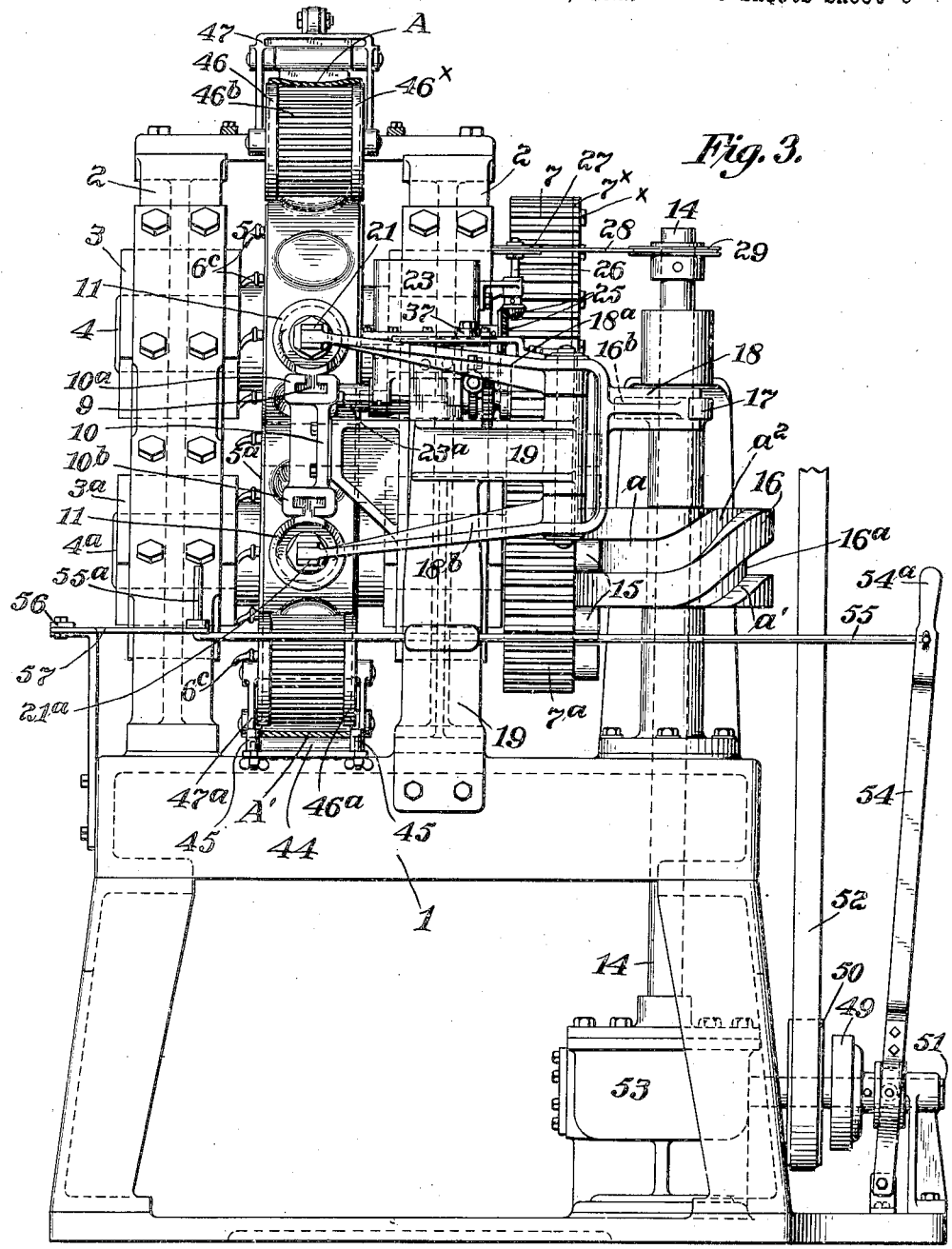
Figure 3 is a front elevation with a few parts in section.
Figures 4, 5:
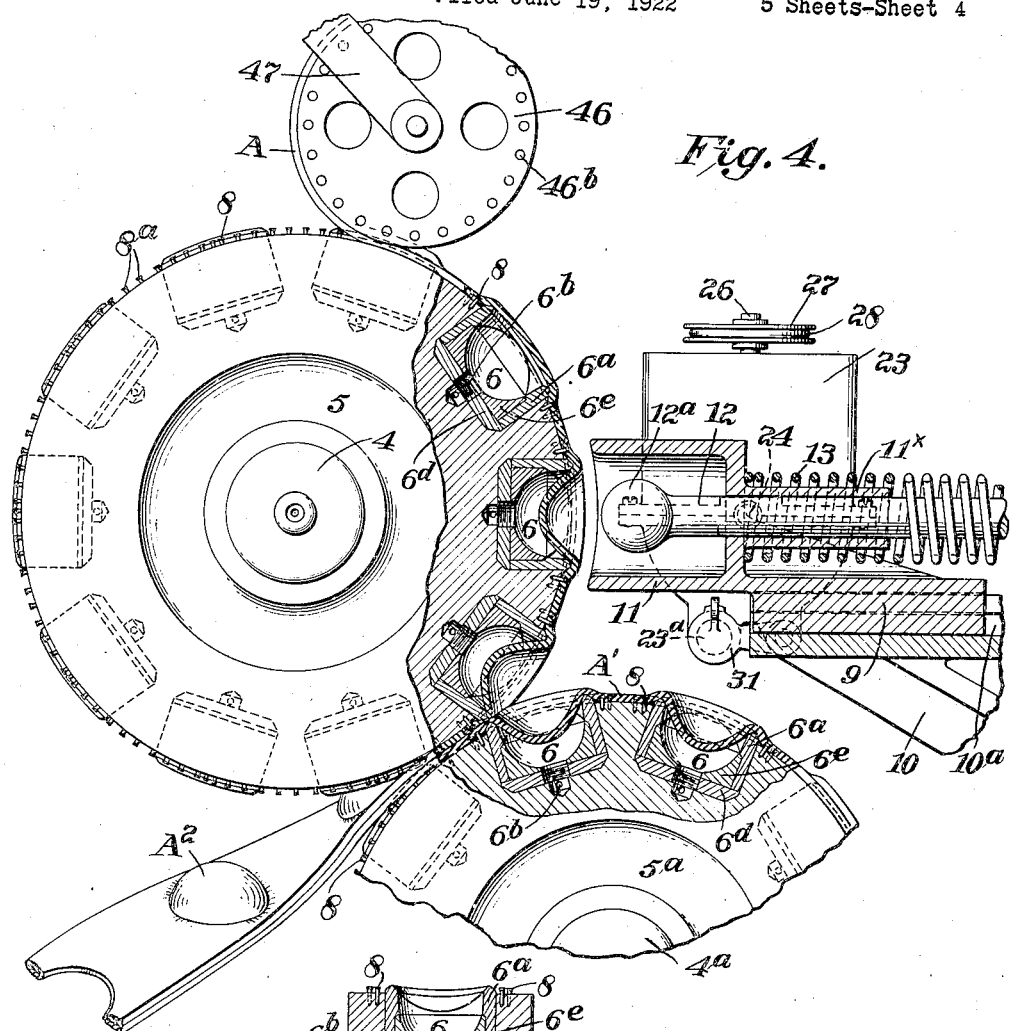
Figure 4 is an enlarged detail view of the forming dies in side elevation, partly broken away, with certain mechanism associated with one of the dies.
Figure 5 is a front view of one of the dies, partly broken away and partly in section, and Figures 6 to 10 inclusive are detail views relative to the feed of the "blower" material.

These members 5 and $5^a$ have equidistantly arranged about their peripheries, the die or mold cavities 6, those of one drum being designed to successively align and cooperate with those of the other drum as said drums rotate, as will clearly appear from Figure 4, the drums being caused to rotate in unison by the intermeshing gears 7 and $7^a$ fast on the shafts 4 and $4^a$ respectively.

Each cavity 6 is surrounded by a raised annular steel cutting and seaming die ring $6^a$ and is provided with a vent $6^b$ terminating in a check valve $6^c$, preferably of rubber as shown.

Preferably the die cavities and rings are formed by boring or otherwise forming cylindrical recesses in the peripheries of the drums into which the die rings are inserted with a press or drive fit, a bottom plate $6^d$ being provided beneath the lower edge of each ring and an interposed filler member $6^e$ which has its periphery seated in an annular rebate in the inner face of the lower wall of the die ring for a purpose which will hereinafter appear. To enable the die rings to be removed for replacement when necessary without injury to the cutting faces, the bottom plate $6^d$ is provided with a screw threaded opening in its center into which can be screwed a suitable tool, the filler member having an aligning opening to permit the passage of the tool. By screwing the tool in until its end bears against the bottom of the die or mold cavity and then continuing the screwing action, the bottom plate will be forced upwardly, thereby shoving out the die ring. Preferably the bottom of the die cavity is recessed as shown to provide a thrust bearing for the end of the tool, and also a means for connection of the vent passage hereinafter described.

Holding pins 8 are arranged around the die rings, preferably in the form of two annular rows, and also in the form of parallel marginal rows as indicated at $8^a$ for the purpose of retaining the stock on the drums as will hereinafter more fully appear.

Clamping members 11 and $11^a$ having ring shaped or annular clamping or pressing faces are arranged to co-operate with the drums 5 and $5^a$ respectively to clamp the stock about the die rings during the time when the portions of the sheets overlying the die or mold cavities is being seated in the die cavities or formed into cup shape by being mechanically forced into the cavities, as will hereinafter appear.

Each of these clamping members comprises a hollow member having a ring shaped face curved to be concentric to the face of the drum, as shown in Figure 4, said clamping devices being supported by or formed integral with slide members 9 mounted to move in a rectilinear path on the supporting guides $10^a$ and $10^b$ of the supporting bracket 10, which is bolted or otherwise suitably secured to the machine frame.

Each of the clamping members has a rearwardly extending guide $11^x$ in which is slidably mounted a plunger rod 12 having a head $12^a$ of a shape to conform substantially to the die cavity and to serve, when the plunger is projected into an aligning cavity, to press the overlying portion of the sheet into the cavity and thus seat or cup the same.

The plungers 12 are operated simultaneously in the manner hereinafter described and the clamping rings or members are normally held in advance of the plungers by helical compression springs 13 which encircle the plungers 12 and projecting guides $11^x$ between the rear faces of the clamping members 11 and collars $12^x$ on the rear ends of the plungers.

The various instrumentalities thus far described are driven or operated in the following manner.

Figure 7:
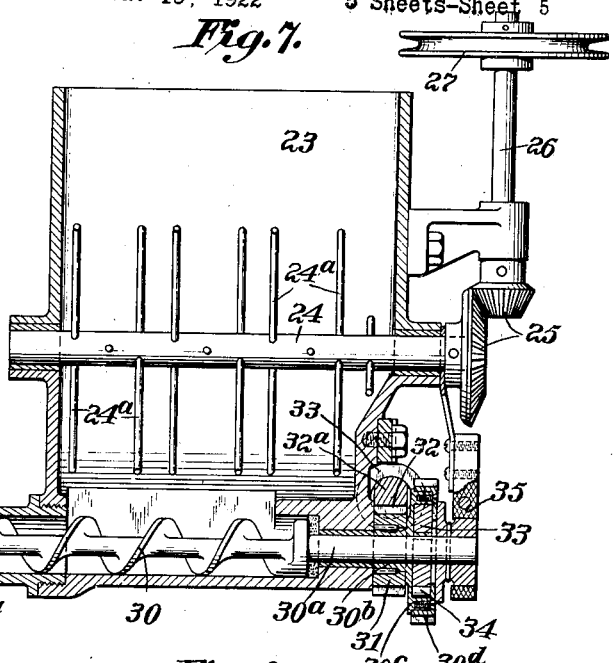
Figure 6:
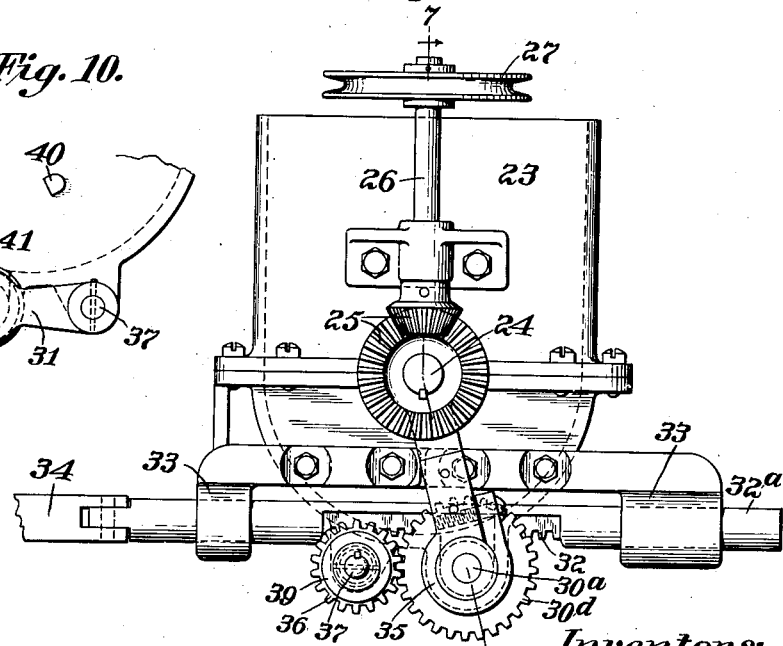

A vertical cam shaft 14 driven and controlled preferably in a manner such as hereinafter described, is provided with a drum cam 16 having an open ended cam groove $16^a$ which is designed to successively engage a plurality of rollers 15 journaled on annularly arranged studs carried by the face of gear $7^a$, the rollers corresponding in number and position to the die or mold cavities in the drum or member $5^a$. During each rotation of the shaft 14 one of the rollers 15 enters the lower end of the groove and travels through the same and out at the opposite end, the relative disposition of rollers and groove being such that before one roller has left the groove, the next succeeding roller has entered the other end thereof, whereby there is a continuous operative connection between the gear and cam. The cam groove has a horizontal or straight portion $a$ extending a suitable distance around the cam, and inclined roller entrance and exit portions $a'$ and $a^2$ respectively. As one of the rollers enters the inclined entrance portion and travels to the horizontal or straight portion, (during which time the preceding roller will be passing through the exit portion), the gear $7^a$ and the drum $5^a$ will be rotated and, through intermeshing gear 7, a corresponding movement will be imparted to the other drum 5. When the roller enters the straight or horizontal portion of the cam groove, a dwell of gear $7^a$ will ensue while the cam rotates through an arc corresponding to the extent of the straight portion during which time the die or mold drums 5 and $5^a$ will remain at rest, and this period is utilized to perform the shaping or cupping of the stock and the depositing of the blowing material which inflates the balls. A second cam $16^b$ (Figure 2) fast on shaft 14 imparts motion to a lever 18 pivoted on a supporting bracket 19, lever 18 being preferably provided with an anti-friction cam-contact roller 17. Lever 18 is provided with a pair of arms $18^a$ and $18^b$ which are connected by links 21 and $21^a$ respectively to the upper and lower plungers 12, the roller 17 being held in contact with the cam by the helical tension spring 22. The upper drum is mounted in such a position relative to the lower drum that their axes lie in a plane preferably inclined at approximately 30° from the vertical but this angle may be varied to suit different sized dies. The purpose of which is to allow blower depositing means to be placed directly above the lower drum whereby a quantity of material may be deposited in the cupped sheets of the mold cavities of the lower drum, which material is of such character that when the articles or biscuits are placed in the molds and subjected to the curing heat, it will be gasified and thereby expand the biscuits into contact with the mold cavity wall, such material being well known in the art. Of course such material could be deposited by hand, but we prefer to provide means for automatically depositing the required amount, and such means may take the form of a hopper 23 (Figures 6 and 7) for containing the material, such hopper being carried preferably by an extension of bracket 19, and having a spout $23^a$ projecting beneath the clamping ring or member 11 and positioned so as to drop blowing material into the cupped portions of the sheet lying directly thereunder, as shown in Figure 4. Preferably means are provided for agitating the material within the hopper, which may take the form of stirrer blades 24ᵃ carried by a shaft 24 driven through beveled gearing 25 from shaft 26 provided at its upper end with a belt pulley 29 fastened on shaft 14, the form of driving means shown being intended to be representative of any desired operating connections. The hopper contains a feed screw 30 in the lower portion thereof and extending into the spout and the spout itself is provided with a cut-off or gate 31. It is desirable that the feed screw and gate should be operated to deliver the material at the time when the cupped portion of the sheet is directly under the spout, and this we preferably accomplish in the manner which will now be described. The feed screw 30 has a shaft extension 30ᵃ which is encircled by a sleeve 30ᵇ which is loose on the shaft and to which sleeve is keyed a pinion 31 which meshes with a rack 32 (Figure 9) carried by or forming part of a rod 32ᵃ guided in bearing brackets 33, secured to the bottom portion of the hopper. This rod is connected by a link 34 with one end of an arm or lever 35, the opposite end of which is articulated to a fixed pivot at 36. A link 37 connects this arm or lever 35 with the lever 18ᵃ hereinbefore described (Fig. 2) and means are provided by which one or both ends of the link may be adjusted along the lever or levers so as to be connected at varying distances from the center whereby the throw of the bar 32ᵃ may be varied. Such means of adjustment may take the form of a plurality of holes in each lever into any one of which the pivot pin for the corresponding end of the link may be connected, as clearly shown in Fig. 2.

Figure 8:
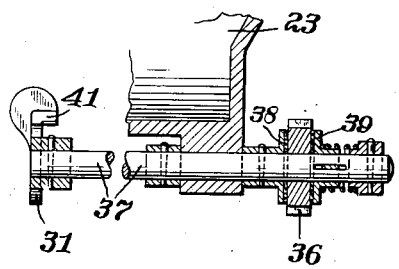
Figure 10:
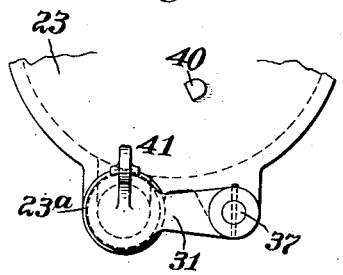

Thus as the lever 18 is actuated by the cam 16ᵃ the rod 32ᵃ and rack 32 will be actuated. As it is, of course, desirable to impart movement to the gear and feed screw only in one direction, we interpose clutch mechanism between the gear and shaft 30. A convenient manner of effecting this is to have connected with or forming part of the sleeve 30ᵇ, a clutch ring 30ᶜ which co-operates with a clutch member 33 keyed to the shaft 30ᵃ, clutch rollers being interposed between the two clutch members as indicated at 33ˣ. Thus as the rack moves in one direction, the shaft will be turned to cause the feed screw 30 to feed material into the spout, while on the reversed movement the clutch will allow the shaft to remain stationary. To prevent any retrograde movement of the shaft, we preferably provide a friction brake as indicated at 35. To open the gate 31 is simultaneously with the operation of the feed screw and to close it again, we preferably provide the following mechanism. Clutch ring or member 30ᶜ carries a gear ring or pinion 30ᵈ which meshes with a pinion 36 loose on a shaft 37 journaled in bearing lugs depending from the bottom of the hopper (Figs. 8 and 10). This pinion is connected with the shaft by friction clutch mechanism in the shape of opposing friction members 38 and 39 which are keyed to the shaft and one of which, 39, is slidable and spring pressed, as clearly shown in Fig. 8. The gate 31 has a projecting arm which is pinned or otherwise fastened to the opposite end of the shaft so that as the shaft oscillates the gate will be opened and closed according to the direction of movement. A stop 40 limited the opening movement of the gate, while a lug 41 on the gate corresponding with the upper side of the spout, limits the closing movement, the additional movement of the gear 36 on said shaft which is operated from the gear 30ᵈ and rack 32 being permitted by the slippage of the friction connection 39—39.

The method of forming hollow articles by the aid of the machine or apparatus above described will now be referred to in detail. Two sheets of plastic material, specifically unvulcanized rubber compound, indicated at A and A' respectively, are fed in any suitable manner and from any convenient source, the tables illustrated conventionally at 43 and 43ᵃ being intended to be illustrative of any such source of supply. From these tables the sheets are led over suitable guide rollers 44 and through guides 45 and thence around upper and lower presser drums 46 and 46ᵃ respectively and between such drums or idle rollers and the mold or die drums 5 and 5ᵃ respectively with which such idle rollers co-operate. The idle rollers 46 and 46ᵃ are carried by levers 47 and 47ᵃ fulcrumed on shaft pivots and acted upon by springs 48 and 48ᵃ which tend to keep the idle rollers pressed towards the drums and hence to press the sheets A and A' against the surface of the mold drums and cause the pins 8ᵃ to penetrate the plastic sheets and hold them in position, in which position they overlie the die or mold cavities. These idle rollers or drums 46 and 46ᵃ are preferably in the shape of spaced discs 46ˣ which contact with the mold drums on each side of the cutting dies and in substantial alignment with the pins 8ᵃ, the said discs being connected by transverse bars or rods 46ᵇ which serve to support the material between the discs and which are depressed far enough below the peripheries of the discs to give the necessary clearance for the projecting edges of the cutting dies.

The cam 16 acting on the rollers of gear 7ᵃ in the manner hereinafter described, having caused a mold cavity in each of the mold drums to move into alignment with the respective pressing rings and plungers and to come to rest in such position, the cam 16ᵇ through lever 18 presses the plungers towards the die cavities. As the pressing rings 11 are normally yieldingly projected beyond the spherical ends of the plungers by the action of the springs 13, the said pressing rings 11 first contact with the rubber stock in the region surrounding the die ring, and clamp it firmly, whereupon the forward movement of the plunger causes its rounded or spherical end to press the portion of the sheet overlying the die cavity down into the cavity. The movement of the plunger is continued until the rubber sheet is cupped to the desired extent that it may be said to be practically seated in the die cavity, though it being understood that the stock is not forced into actual contact or pressed against the walls of the cavity, as these walls are not relied upon in the shaping of the rubber, which is accomplished by the resistance of the rubber to the pressure of the plungers. As the sheet is forced down into the cavity, the air within the cavity is expelled, and by having the die cavity of semi-spherical shape and forcing the rubber down into the cavity until it is juxtaposed to the cavity wall, nearly all of the air is expelled through the vent and check valve. After the rubber has been thus cupped, the plungers and clamping ring recede. The rubber compound has some resilience, and it therefore tends to return in part towards its original flat position, but as the check valve prevents any air from returning through the vent, and as the pins surrounding the die opening hold the rubber so closely as to prevent any air from entering over its edge, the tendency of the rubber to return toward its flat condition will be resisted by the partial vacuum or suction which will exist in the die or mold cavity behind the cupped sheet. It will be understood that the operation which has thus been described in the singular takes place simultaneously in connection with the upper and lower drums, the positions of simultaneous operation being shown in Figure 1. As soon as the plungers are lifted, the mold drums resume their rotary movement and the result is that the edges of two opposed cupped halves or article sections are rolled together and the die rings 6ª, being provided with blunt cutting edges, the co-operating action of the opposed die rings serves to not only press the two cupped blanks together, but to die them out or separate them from the sheet. While in effect completely separated from the sheet, the biscuit which has been formed by the action thus described remains in position in the sheet by reason of the tacky nature of the material, as indicated at A² Fig. 4, but it can be readily detached therefrom by hand or in any other suitable manner.

We have found that in the method of operation hereinbefore described, there is a certain amount of longitudinal stretch imparted to the plastic sheets as they pass around the drums and are acted upon by the cupping plungers, and that if the dies were made of truly cylindrical form the tendency of the plastic material to return to its normal condition after leaving the drums would result in a biscuit which would not be cylindrical at its equator or line of junction of the two sections, but would be considerably shorter on the diameter corresponding to the circumference of the forming drum than the diameter transverse thereto. To avoid this effect, we make the die cavities and die or cutting rings of a somewhat elliptic shape with the longest diameter arranged circumferentially of the forming drum, as shown in Fig. 5. This produces an article or biscuit which while held by the dies has an equatorial diameter taken lengthwise of the strip which is longer than the transverse diameter, but after the biscuit leaves the press the inherent stretch reduces this longer diameter and produces a biscuit which is substantially circular at its equator or line of junction.

In an apparatus operating in the manner disclosed, it is desirable to have attendants, preferably three, who can be of the unskilled class, and who would observe the stock sheets A and A' entering the machine to look out for imperfections in the sheets or any other defects, and remove the formed biscuits from the sheets as they emerge from between the drums. In order that any one of the attendants may readily stop the machine in case of defects in the work or other conditions, means are provided by which its operation may be controlled from a plurality of points, and such means may conveniently take the form of a shiftable friction clutch member 49 designed to operatively connect loose pulley 50 to power shaft 51, pulley 50 being driven by belt 52 from any convenient source of power, and shaft 51 being connected to vertical shaft 14 by worm gearing (not shown) contained in gear box 53. Clutch 49 is directly controlled by lever 54 having a handle 54ª within convenient reach of an operator at one side of the machine, at the front thereof.

A rod 55 connected at one end to clutch lever 54 extends across the front to the opposite side where it is provided with a handle 55ª convenient to an operator on said other side of the machine. A lever 56 fulcrumed on a fixed pivot, has its front end connected by a link 57 to rod 55, while its rear end is provided with an operating handle 56ª convenient to an attendant at the rear of the machine.

As the molds or dies of the respective drums must be kept in perfect alignment, we provide means for taking up or preventing any lost movement between the gear teeth, and such means may take the form of an annular gear ring 7ˣ on one of the gears, for instance the upper one 7, aggregate thickness of gear 7 and ring carried thereby being equal to the thickness of gear 7ᵃ. Ring 7ˣ is secured to gear 7 by bolts X passing through circumferentially elongated bolt holes in the ring and by loosening the bolts, the ring may be shifted to displace the teeth of the ring sufficiently relative to the teeth of the gear to take up any lost motion due to construction or wear.

Having thus described our invention what we claim is:—

1. The method of making hollow articles, which consists in mechanically shaping the stock in mold cavities of rotatable molds to form article sections, retaining the formed sections in the cavities by suction and seaming the edges of article sections by co-operation between the molds.

2. The method of making hollow articles, which consists in mechanically shaping the stock while resiliently supporting the polar regions in mold cavities of rotatable molds to form article sections and seaming the edges of article sections by co-operation between the molds.

3. The method of making hollow articles, which consists in mechanically shaping the stock in mold cavities of rotatably mounted molds, retaining the formed stock in such cavities, and effecting relative movement of the molds to bring complementary cavities into register and to seam the juxtaposed edges of article sections.

4. The method of making hollow articles, which consists in intermittently revolving juxtaposed rotatable molds, to feed plastic stock in sheet form over their peripheries and between them, mechanically forming the stock in the mold cavities of the molds, retaining the formed stock in the cavities by suction, and seaming the edges of complementary sections by the rolling contact of the molds.

5. The method of making hollow articles, which consists in intermittently revolving juxtaposed rotatable molds, to feed plastic stock in sheet form over their peripheries and between them, mechanically forming the stock in the mold cavities of the molds, retaining the formed stock in the cavities by suction, seaming the edges of complementary sections by the rolling contact of the molds, and lastly vulcanizing the formed articles.

6. The method of making hollow articles, which consists in intermittently revolving juxtaposed rotatable molds, to feed plastic stock in sheet form over their peripheries and between them, mechanically forming the stock in the mold cavities of the molds, retaining the formed stock in the cavities by suction, introducing a medium into an article section which will expand under the action of vulcanization seaming the edges of complementary sections by the rolling contact of the molds, and lastly vulcanizing the formed articles.

7. The steps in the making of hollow articles, which consist in mechanically forming plastic stock in a cavity of a rotating mold, and retaining the formed stock in such cavity by suction during the rotation of the mold.

8. The method of making hollow articles, which consists in mechanically forming the stock in the cavities of juxtaposed rotatable molds, automatically applying suction to retain the formed sections in said cavities and automatically seaming the edges of complementary article sections by the co-operation between said molds.

9. The method of making hollow articles from plastic sheet stock, which consists in shaping the plastic stock in the cavities of rotatable molds by means of a preponderance of pressure mechanically exerted against the sheet stock and retaining the formed stock in the cavities during the rotation of the molds by permitting the air to exhaust from such cavities.

10. The method of making hollow articles from plastic stock, which consists in effecting relative movement between a male forming member and plastic stock passing around a rotatable mold to form the stock around the male forming member, and maintaining the formed stock in its formed condition by fluid pressure.

11. The method of making hollow articles from plastic stock, which consists in mechanically cupping the stock in mold cavities of rotatable molds to form article sections, venting the mold cavities to allow the air to escape during such cupping action, and preventing the return of the air whereby the sheets are retained in cup form by preponderance of fluid pressure.

12. The method of making hollow articles from plastic stock, which consists in mechanically cupping the stock in the mold cavities of rotatable molds to form article sections, mechanically holding the sheet around the mold cavity during such cupping action, and retaining the articles in cupped form by fluid pressure.

13. The method of making hollow articles from plastic stock, which consists in cupping the stock in mold cavities of rotatable molds by the action of a forming plunger, and mechanically clamping the stock around the mold cavities during the action of the plunger.

14. The method of making hollow articles from plastic stock, which consists in cupping the stock in mold cavities of rotatable molds by the action of a forming plunger, mechanically clamping the stock around the mold cavities during the action of the plunger, and mechanically holding the sheet against displacement in regions surrounding the mold cavities during and after the removal of the clamping and cupping means.

15. The method of making hollow articles from plastic stock, which consists in cupping the stock in mold cavities of rotatable molds by the action of a forming plunger, and mechanically clamping the stock around the mold cavities during the action of the plunger and seaming the edges of article sections together by co-operative mold action.

16. The method of making hollow articles from plastic stock, which consists in cupping the stock in mold cavities of rotatable molds by the action of a forming plunger, mechanically clamping the stock around the mold cavities during the action of the plunger, mechanically holding the sheet against displacement in regions surrounding the mold cavities during and after removal of the clamping and cupping means, and seaming the edges of article sections together while so held in such regions.

17. The method of making hollow articles from plastic stock, which consists in shaping the stock in mold cavities of rotary molds to form article sections which cavities are elongated circumferentially of the molds, and seaming together the edges of the article sections.

18. The method of making hollow articles from plastic stock, which consists in feeding plastic sheets to rotary molds having mold cavities elongated circumferentially of the molds, cupping the portions of the sheets overlying said cavities, and joining the edges of such cupped portions by the co-operative action of the rotary molds.

19. The method of making hollow articles from plastic stock, which consists in feeding plastic sheets to rotary molds having mold cavities elongated circumferentially of the molds, cupping the portions of the sheets overlying said cavities, and joining the edges of such cupped portions and simultaneously severing them from the sheets.

20. Apparatus for making hollow articles from plastic material comprising a pair of co-operating rotary molds, having co-operating mold cavities, means for feeding sheet stock to such molds, means for mechanically cupping the portions of the stock overlying such cavities, and means for venting the mold cavities during the mechanical cupping.

21. Apparatus for making hollow articles from plastic sheets, comprising a pair of co-operating molds having cavities, means for feeding stock in sheet form thereto, said cavities having air vents provided with non-return valves, and means for forcing portions of the sheets overlying said cavities down into the cavities.

22. Apparatus for making hollow articles from plastic sheets, comprising a pair of co-operating molds having cavities, means for feeding stock in sheet form thereto, said cavities having air vents provided with non-return valves, means for forcing portions of the sheets overlying said cavities down into the cavities, and means for holding said sheets in regions surrounding said cavities during the action of such forcing means.

23. In apparatus of the class described, a pair of rotary drums having peripheral cavities, means for intermittently rotating said drums, means for feeding plastic sheets to overlie said cavities, and mechanical means for deflecting the overlying portions of the sheets into said cavities.

24. In apparatus of the class described, a pair of rotary drums having peripheral cavities, means for intermittently rotating said drums, means for feeding plastic sheets to overlie said cavities, mechanical means for deflecting the overlying portions of the sheets into said cavities, and means for causing said portions to be held deflected by a preponderance of fluid pressure.

25. In apparatus of the class described, a pair of rotary drums having peripheral cavities, means for intermittently rotating said drums, means for feeding plastic sheets to overlie said cavities, and mechanical means for deflecting the overlying portions of the sheets into said cavities, said cavities having air vents and non-return valves controlling said vents.

26. In apparatus of the class described, a pair of rotary drums having co-operating cavities, means for feeding plastic sheets thereto, means for intermittently rotating said drums, means for successively clamping the sheets in regions about the cavities, and plungers for coupling the sheets while so clamped, with means for operating them.

27. In apparatus of the class described, a pair of rotary drums having co-operating cavities, means for feeding plastic sheets to overlie said cavities, means for intermittently rotating said drums, plungers for forcing the overlying portions of the sheets into said cavities, and clamping rings yieldingly held normally in advance of said plungers and designed to clamp the sheets in regions surrounding said cavities.

28. In apparatus of the class described, a pair of rotary drums having co-operating cavities, means for intermittently rotating said drums, plungers for forcing the overlying portions of the sheets into said cavities, means for operating said plungers in unison, and clamping rings yieldingly held normally in advance of said plungers and designed to clamp the sheets in regions surrounding said cavities.

29. In apparatus of the class described, a rotary mold member having mold cavities, means for intermittently rotating the same, means for feeding a sheet of plastic material to overlie said cavity, means for mechanically forcing overlying sheet portions into said cavities to form article sections, and means for subsequently seaming the edges of other article sections to the edges of said first named article sections.

30. In apparatus of the class described, a rotary mold member having mold cavities, means for intermittently rotating the same, means for feeding a sheet of plastic material to overlie said cavities, means for clamping the sheet in regions surrounding said cavities, means for cupping the sheet while so clamped to produce article sections, and means for subsequently seaming the edges of other article sections to the edges of said first named sections.

31. In apparatus of the class described, a rotary mold member having annularly arranged cavities, means for feeding plastic sheet material to overlie said cavities, a plunger mounted to reciprocate towards and from said member and adapted to successively align with said cavities, a clamping ring yieldingly held in advance of said plunger and operated thereby, and means for intermittently rotating said member and operating said plunger.

32. In apparatus of the class described, a rotary mold member having annularly arranged cavities, means for feeding plastic sheet material to overlie said cavities, a slide mounted to reciprocate towards and from said member, a ring shaped member carried by said slide adapted to clamp said sheet in regions surrounding said cavities, a plunger having a shaping head within said ring shaped member, means for reciprocating said plunger and means for yieldingly moving said ring shaped member in advance of the plunger on the forward stroke of the latter.

33. In apparatus of the class described, a rotary mold member having annularly arranged cavities, means for feeding plastic sheet material to overlie said cavities, a slide mounted to reciprocate towards and from said member, a ring shaped member carried by said slide adapted to clamp said sheet in regions surrounding said cavities, a plunger having a shaping head within said ring shaped member means for reciprocating said plunger, and a spring interposed between said ring shaped member and plunger.

34. In apparatus of the class described, a rotary mold member having annularly arranged cavities, means for feeding plastic sheet material to overlie said cavities, a slide mounted to reciprocate towards and from said member, a ring shaped clamping member carried by said slide, a guide also carried by said slide in axial alignment with said clamping member, a plunger working in said guide having a shaping head, and a spring interposed between said plunger and clamping member.

35. In apparatus of the class described, a rotary mold member having a face provided with annularly disposed cavities, plastic sheet engaging projections carried by said face, means for feeding sheet material to said face, and means for forcing the material overlying the cavities into such cavities.

36. In apparatus of the class described, a rotary mold member having a face provided with annularly arranged cavities, a row of sheet engaging projections on said face on each side of said cavities, means for feeding plastic sheet material to said face and embedding the projections in the material, and means co-operating with said cavities to cup the sheets.

37. In apparatus of the class described, a rotary mold member having a face provided with annularly arranged mold cavities, annularly disposed sheet engaging projections on said face adjacent each cavity, means for pressing plastic sheet material into engagement with said projections and means for deflecting portions of the sheet within said projections into said cavities.

38. In apparatus of the class described, a rotary mold member having a face provided with annularly arranged mold cavities, said cavities having air vents provided with non-return valves, sheet engaging projections on said face around each cavity, means for pressing regions of plastic sheets about said cavities into engagement with said projections, and means for deflecting the sheet into said cavities while so pressed.

39. In apparatus of the class described, a rotary mold member having a face provided with annularly arranged cavities, an annular row of sheet engaging projections on each side of said cavities, and means for applying a plastic sheet to the face of said mold member, comprising a pair of rotary discs having their peripheries opposed to said projections.

40. In apparatus of the class described, a rotary mold member having a face provided with annularly arranged cavities, an annular row of sheet engaging projections on each side of said cavities, and means for applying a plastic sheet to the face of said mold member, comprising a pair of rotary discs having their peripheries opposed to said projections, and means carried by said discs for supporting the intervening portion of the sheet.

41. In apparatus of the class described, a rotary mold member having a face provided with annularly arranged cavities, an annular row of sheet engaging projections on each side of said cavities, and means for applying a plastic sheet to the face of said mold member, comprising a pair of rotary discs having their peripheries opposed to said projections, and annularly arranged cross bars connecting said discs for supporting the central portion of the sheet.

42. In apparatus of the class described, a pair of co-operating rotary mold members, gearing for causing said members to rotate in unison, annularly arranged studs carried by one of said gears, and a cam having an open-ended cam groove to be engaged by said studs.

43. In apparatus of the class described, a pair of co-operating rotary mold members, gearing for causing said members to rotate in unison, annularly arranged studs carried by one of said gears, and a cam having an open-ended cam groove to be engaged by said studs, one of said gears having an adjustable gear section to take up lost motion due to wear.

44. In apparatus of the class described, a pair of co-operating rotary mold members, gearing for causing said members to rotate in unison, annularly arranged studs carried by one of said gears, and a cam having an open-ended cam groove to be engaged by said studs, one of said gears having a circumferentially adjustable gear ring or section.

45. In apparatus of the class described, a pair of co-operating drums having peripheral cavities, said drums being journaled on parallel axes located in an inclined plane, means for intermittently rotating said drums, means acting against the faces of said drums for cupping sheet material placed across said cavities, and means located above the lower drum for depositing blower material into the cupped sheet portions carried thereby.

46. In apparatus of the class described, a pair of co-operating drums having peripheral cavities, said drums being journaled on parallel axes located in an inclined plane, means for intermittently rotating said drums, means co-operating with said drums for cupping sheet material placed across said cavities, and means located above the lower drum for depositing blower material into the cupped sheet portions carried thereby, said feeding means comprising a hopper having a delivery spout, a valve controlling the same and means for intermittently operating said valve.

47. In apparatus of the class described, a pair of co-operating drums having peripheral cavities, said drums being journaled on parallel axes located in an inclined plane, means for intermittently rotating said drums, means co-operating with said drums for cupping sheet material placed across said cavities, and means located above the lower drum for depositing blower material into the cupped sheet portions carried thereby, said means comprising a hopper having a spout, a feed device for feeding material to said spout, a cut-off for said spout, and means for operating said feed device and cut-off in unison.

48. In apparatus of the class described, a pair of co-operating rotary mold members having mold cavities, a pair of sheet clamping and cupping devices co-operating therewith, a forked lever having arms connected to operate said clamping and cupping devices, and means for rocking said arm.

49. In apparatus of the class described, a pair of co-operating rotary mold members having peripheral mold cavities, gearing connecting said members, a plurality of studs annularly arranged about the axis of one of said mold members and connected to rotate in unison therewith, a shaft adjacent said studs and perpendicular to said axis and having a drum cam provided with an open-ended cam groove to be successively engaged by said studs, sheet clamping and cupping means co-operating with said mold cavities and a cam on said shaft for actuating said clamping and cupping means.

50. In apparatus of the class described, a pair of co-operating rotary drums having peripheral cavities, means for feeding plastic sheet material to overlie said cavities, a pair of plungers mounted to reciprocate towards and from said drums and adapted to successively align with said cavities, clamping rings yieldingly held in advance of said plungers and operated thereby, and means for intermittently rotating said drums and operating said plungers.

51. In apparatus of the class described, a pair of co-operating rotary drums having peripheral cavities, means for feeding plastic sheet material to overlie said cavities, slides mounted to reciprocate towards and from said drums, ring shaped members carried by said slides adapted to clamp said sheet material in regions surrounding said cavities, plungers having shaping heads movable through said ring shaped members, means for reciprocating said plungers and means for yieldingly moving said ring shaped members in advance of the plungers on the forward stroke of the latter.

52. In apparatus of the class described, a pair of co-operating rotary drums having annularly arranged cavities, means for feeding plastic sheet material to overlie said cavities, slides mounted to reciprocate towards and from said drums, ring shaped members carried by said slides adapted to clamp said sheet in regions surrounding said cavities, plungers having shaping heads movable through said ring shaped members, means for reciprocating said plungers, and springs interposed between said ring shaped members and plungers.

53. In apparatus of the class described, a pair of rotary drums having peripheral cavities, means for feeding plastic sheet material to overlie said activities, slides mounted to reciprocate towards and from said drums, ring shaped clamping members carried by said slides, guides also carried by said slides in axial alignment with said clamping members, plungers working in said guide having shaping heads, and springs interposed between said plungers and clamping members.

54. In apparatus of the class described, a pair of rotary mold members having peripheral faces provided with cavities, plastic sheet engaging projections carried by said face, means for feeding sheet material to said faces, and means for forcing the material overlying the cavities into such cavities.

55. In apparatus of the class described, a pair of co-operating rotary mold members having peripheral faces provided with cavities, a row of sheet engaging projections on said faces on each side of said cavities, means for feeding plastic sheet material to said faces and embedding the projections in the material, and means co-operating with said cavities to cup the sheets.

56. In apparatus of the class described, a pair of rotary mold members having peripheral faces provided with mold cavities, sheet engaging projections on said faces adjacent each cavity, means for pressing plastic sheet material into engagement with said projections and means for deflecting portions of the sheet within said projections into said cavities.

57. In apparatus of the class described, a pair of rotary mold members having peripheral faces provided with cavities, said cavities having air vents provided with non-return valves, sheet engaging projections on said faces around each cavity, means for pressing regions of plastic sheets about said cavities into engagement with said projections, and means for deflecting the sheet material into said cavities while so pressed.

58. In apparatus of the class described, a pair of rotary mold members having peripheral faces provided with cavities, an annular row of sheet engaging projections on each face on each side of said cavities, and means for applying plastic sheet material to said faces, comprising a pair of rotary discs having their peripheries opposed to said projections.

59. In apparatus of the class described, a pair of co-operating rotary mold members having peripheral faces provided with cavities, an annular row of sheet engaging projections on each face on opposite sides of said cavities, and means for applying plastic sheet material to the faces of said mold members, comprising a pair of rotary discs having their peripheries opposed to said projections, and means carried by said discs for supporting the intervening portion of the sheet material.

60. In apparatus of the class described, a pair of rotary mold members having peripheral faces provided with cavities, an annular row of sheet engaging projections on each face on each side of said cavities, and means for applying a plastic sheet to the faces of said mold members, comprising a pair of rotary discs having their peripheries opposed to said projections, and annularly arranged cross bars connecting said discs for supporting the central portions of the sheet material.

61. In apparatus of the class described, a pair of co-operating rotary mold members connected to rotate in unison, annularly arranged equally spaced projections rigidly connected with one of said members, and a rotary cam member having an open-ended cam groove to be engaged by said projections, said groove having a straight intermediate portion and oppositely deflected entrance and exit portions.

62. In apparatus of the class described, a pair of co-operating drums having peripheral cavities and die rings surrounding said cavities, said drums being journaled on parallel axes located in an inclined plane, means for intermittently rotating said drums, means co-acting with said drums for cupping sheet material placed across said cavities, and means located above the lower drum for depositing blower material into the cupped sheet portions carried thereby, said feeding means comprising a hopper having a delivery spout, a valve controlling the same and means for intermittently operating said valve.

63. In apparatus of the class described, a pair of co-operating drums having peripheral cavities and die rings surrounding said cavities, said drums being journaled on parallel axes located in an inclined plane, means for intermittently rotating said drums, means acting against the sides of said drums for cupping sheet material placed across said cavities, and means located above the lower drum for depositing blower material into the cupped sheet portions carried thereby, said means comprising a hopper having a spout, a feed device for feeding material to said spout, a cut-off for said spout, and means for operating said feed device and cut-off in unison.

64. In apparatus of the class described, a pair of co-operating rotary drums having peripheral cavities, means for intermittently rotating said drums in unison, means for feeding a pair of sheets of plastic material to overlie said cavities, a pair of plungers mounted to reciprocate towards and from said drums and adapted to successively align with said cavities, clamping rings yieldingly held in advance of said plungers and operated thereby, and means for simultaneously operating said plungers.

65. In apparatus of the class described, a pair of rotary drums having peripheral cavities, means for feeding a pair of plastic sheets to overlie said cavities, slides mounted to reciprocate towards and from said drums, a ring shaped member carried by each slide adapted to clamp said sheets in regions surrounding said cavities, a plunger having a shaping head movable within each ring shaped member, an operating element connected to both said plungers for operating them in unison, and means for yieldingly moving said ring shaped members in advance of the plungers on the forward stroke of the latter.

66. In apparatus of the class described, a pair of rotary drums having peripheral cavities, means for feeding a pair of plastic sheets to overlie said cavities, a pair of slides mounted to reciprocate towards and from said drum, a ring shaped member carried by each slide adapted to clamp said sheets in regions surrounding said cavities, plungers having shaping heads movable within said ring shaped members, means for reciprocating said plungers in unison, and springs interposed between said ring shaped members and plungers.

67. In apparatus of the class described, a pair of rotary mold members having faces provided with annularly disposed cavities and annular seaming and cutting dies, plastic sheet engaging projections carried by said faces around said dies, means for feeding a pair of plastic sheets to said faces, and into engagement with said projections, and means for forcing the material overlying the cavities into such cavities.

68. In apparatus of the class described, a pair of rotary mold members having faces provided with annularly arranged cavities surrounded by annular cutting and seaming dies, a row of sheet engaging projections on each face on each side of said cavities, means for feeding a sheet of plastic material to each face and embedding the projections in the material, and means co-operating with said cavities to cup the sheets.

69. In apparatus of the class described, a pair of rotary mold members having faces provided with peripheral mold cavities, annular cutting and seaming dies around such cavities, annularly disposed sheet engaging projections on each face around each die, means for pressing plastic sheet material into engagement with said projections, and means for deflecting portions of the sheet within said pins into said cavities.

70. In apparatus of the class described, a pair of rotary mold members having faces provided with annularly arranged mold cavities and annular cutting and seaming dies, said cavities having air vents provided with non-return valves, sheet engaging projections on said faces around each die, means for pressing regions of plastic sheets about said dies into engagement with said projections, and means for deflecting the sheets into said cavities while so pressed, 71. In apparatus of the class described, a pair of rotary mold members having peripheral faces provided with cavities and cutting and seaming dies around said cavities, an annular row of sheet engaging projections on opposite sides of said dies, and means for applying a plastic sheet to the face of each mold member, comprising a pair of rotary discs having their peripheries opposed to said projections.

72. In apparatus of the class described, a pair of rotary mold members having peripheral faces provided with annularly arranged cavities, annular cutting and seaming dies around said cavities, annular rows of sheet engaging projections on opposite sides of said dies, and means for applying a plastic sheet to the face of each mold member, comprising a pair of rotary discs having their peripheries opposed to said projections, and means carried by said discs for supporting the intervening portion of the sheet.

73. In apparatus of the class described, a pair of rotary mold members having peripheral faces provided with cavities, annular cutting and seaming dies around said cavities, an annular row of sheet engaging projections on opposite sides of said dies, and means for applying a plastic sheet to the face of said mold member, comprising a pair of rotary discs having their peripheries opposed to said projections, and annularly arranged cross bars connecting said discs for supporting the central portion of the sheet.

74. The method of making hollow articles, which consists in mechanically seating the stock in mold cavities of rotatable molds to form article sections and seaming the edges of article sections by cooperation between the molds.

75. The method of making hollow articles, which consists in mechanically seating the stock in mold cavities of rotatable molds to form article sections, retaining the formed sections in the cavities by suction and seaming the edges of article sections by cooperation between the molds.

76. The method of making hollow articles, which consists in mechanically seating the stock while resiliently supporting the polar regions in mold cavities of rotatable molds to form article sections, and seaming the edges of article sections by cooperation between the molds.

77. The method of making hollow articles, which consists in mechanically seating the stock in mold cavities of rotatably mounted molds, retaining the formed stock in such cavities, and effecting relative movement of the molds to bring complementary cavities into register and to seam the juxtaposed edges of article sections.

78. The method of making hollow articles from plastic stock, which consists in seating the plastic stock in the cavities of rotatable molds by means of a preponderance of pressure mechanically exerted against the sheet stock, and retaining the formed stock in the cavities during the rotation of the molds by permitting the air to exhaust from such cavities.

79. The method of making hollow articles from plastic stock, which consists in effecting relative movement between a male forming member and plastic stock passing around a rotatable mold to form the stock around the male forming member, and maintaining the formed stock in its formed condition by fluid pressure.

In testimony whereof, we affix our signatures.

CHARLES W. STEELE.
RICHARD T. GRIFFITHS.